United States Patent [19]

Ohlson

[11] 4,314,315
[45] Feb. 2, 1982

[54] REAR LIGHT UNIT FOR LORRIES

[76] Inventor: Kjell F. Ohlson, Tallmovägen 2B, 752 45 Uppsala, Sweden

[21] Appl. No.: 58,558

[22] Filed: Jul. 18, 1979

[51] Int. Cl.³ .............................................. B60Q 1/00
[52] U.S. Cl. ..................... 362/80; 362/249; 362/390
[58] Field of Search ............... 362/368, 82, 80, 249, 362/390

[56] References Cited

U.S. PATENT DOCUMENTS

2,571,130  10/1951  Hargis ................................. 362/368

Primary Examiner—Stephen J. Lechert, Jr.
Attorney, Agent, or Firm—Witherspoon & Hargest

[57] ABSTRACT

A box unit for attachment to the rear end lorry of a vehicle having mounting means for lights, number plate, and a foot step area for climbing the load platform of the lorry.

11 Claims, 8 Drawing Figures

REAR LIGHT UNIT FOR LORRIES

Generally speaking this invention may be said to refer to a rear light box unit for lorries, such unit being conceived as a unitary aggregate prior to being mounted on the lorry. In addition to simple and protected positioning of the rear light aggregate, normally comprising blinker, rear lamp and stop light, the box unit permits protected mounting of the number plate and protected attachment of the side marking lamp. In its mounted state the box unit forms a foot step facilitating climbing the load platform of the lorry, an air-guiding means, so-called spoiler, counteracting soiling is provided in the box unit.

Thus, this invention generally refers to arrangements on lorries, the invention specifically referring to a new box unit intended to be attached in readily mounted condition at the rear end of a lorry.

Huge lorries are at present provided with driver's cabins which are specifically constructed to offer the driver and his companion agreable driving conditions. Various measures have been taken in order to increase the comfort in the driver's cabin, for example provision of air-conditioning, radio equipment and the like. Outside the driver's cabin, however, the working conditions for the driver and his hand are considerably less agreable; for example, in many cases foot steps facilitating climbing the loading platform are missing. It is one of the purposes of the invention to eliminate this drawback by providing a box unit which in mounted condition forms a foot step facilitating access to the loading platform.

Huge modern lorries are at present provided at the rear end with under-drive protection or a hydraulic lifting device as well as sometimes with some type of backing protection. In spite of this the rear light arrangement of lorries is often exposed to damage due to its location. Large amount of money is annually expended in connection with the exchange not only of the glass covering the rear light arrangements but sometimes of all the lamp. By providing a specific rear light box unit in which the rear light array has a protected location, this problem is eliminated.

Behind moving lorries a negative pressure is often created due to the air displacement, such negative pressure causing whirled-up sand and other soiling particles to collect on the rear parts of the lorry thereby quickly soiling the rear light array and number plate to such an extent that their normal function is hampered. This problem is reduced to a great extent in accordance with the present invention by providing an air-guiding device, so-called spoiler, within the box unit, thereby reducing the previously experienced soiling tendency.

By its resilient mounting the box unit according to the invention without damage may be shifted from its intended position of use. Moreover, in accordance with the invention arrangements are proposed causing the box unit, after such a displacement, automatically to revert to its intended location by cooperation with inclinded guiding surfaces.

Finally, the rear portions of lorries in many cases are provided with such equipment as current sockets and the like. Previously such arrangements have been located at various places were illumination with the aid of a normal lighting arrangement of the lorry generally has not been possible. In accordance with the present invention a possibility is offered to mount such current sockets in direct connection to such lighting arrangements such as number plate lamps, the box unit according to the invention thus offering the possibility of mounting current sockets within the range of a lamp. As mentioned above, many lorries nowadays are provided with hydraulic lifting portions for e.g. loading and unloading of goods. This equipment is manipulated by the aid of a lifting contact; the present invention offers the possibility to mount in a convenient and protected way such lifting contacts fixedly on a protected place within the box unit or to provide in a protected position within the box unit a lift control unit with extension cable enabling manipulation to be performed from an arbitrary place near the equipment. The invention also offers the possibility to provide such a lorry having a lifting arrangement with an additional lower loop-shaped side foot step because the lifting device prevents a foot step from being provided below the driving protection and mounting thus must be performed from the side of the vehicle.

Even if certain advantages and specific features of the invention are achieved in connection with the above description of the primary aims of the invention, the expert on the field will understand that the invention may eliminate other drawbacks of prior-art equipment not described in detail. The invention may be varied and modified within the frame of the attached claims, and the following description only refers to a presently preferred embodiment which is illustrated on the attached drawings.

Figure 1:
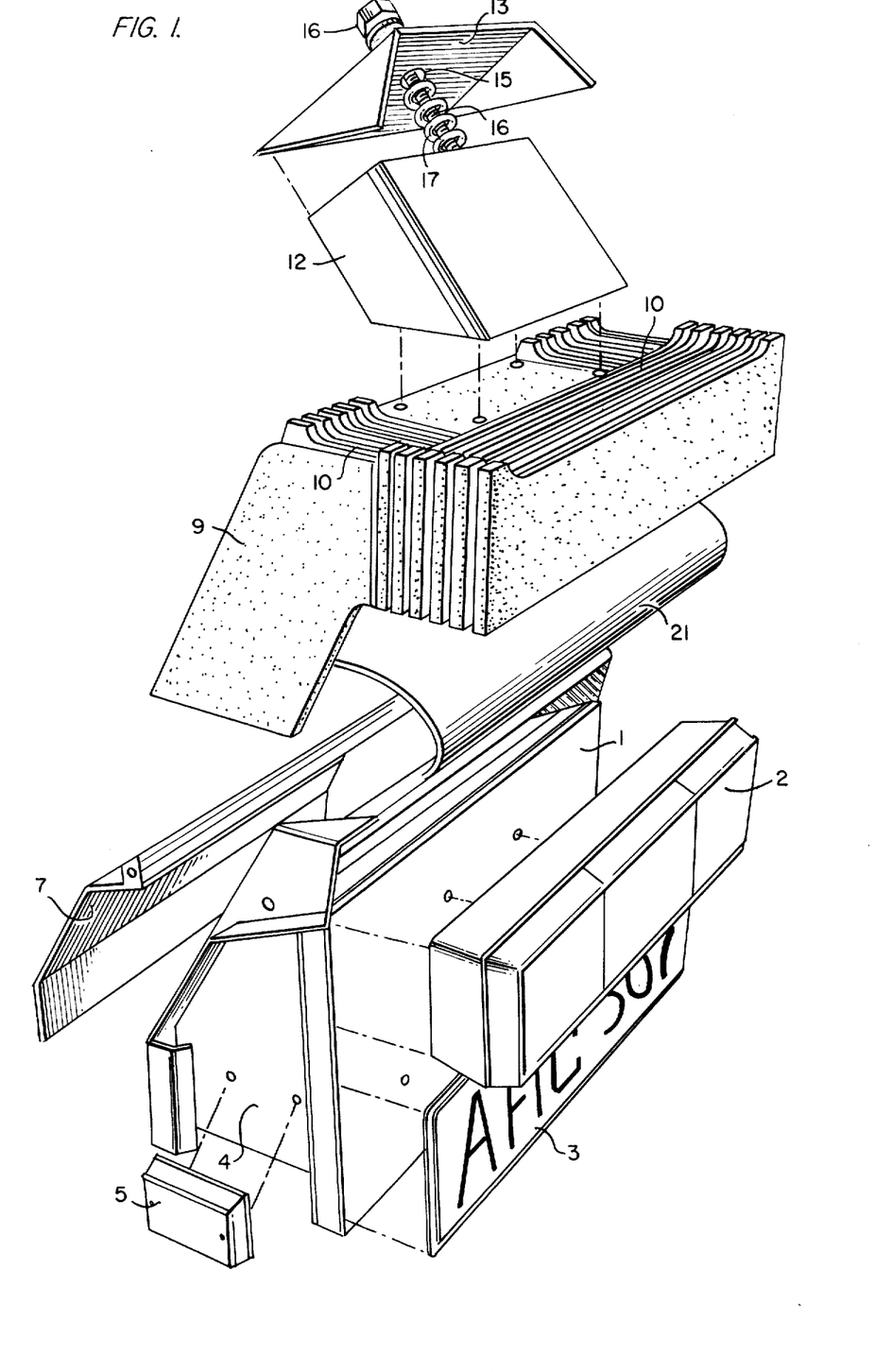
FIG. 1 is a perspective exploaded view showing the various details forming part of the rear light box unit according to the invention prior to being assembled into a unitary aggregate.
Figure 2:
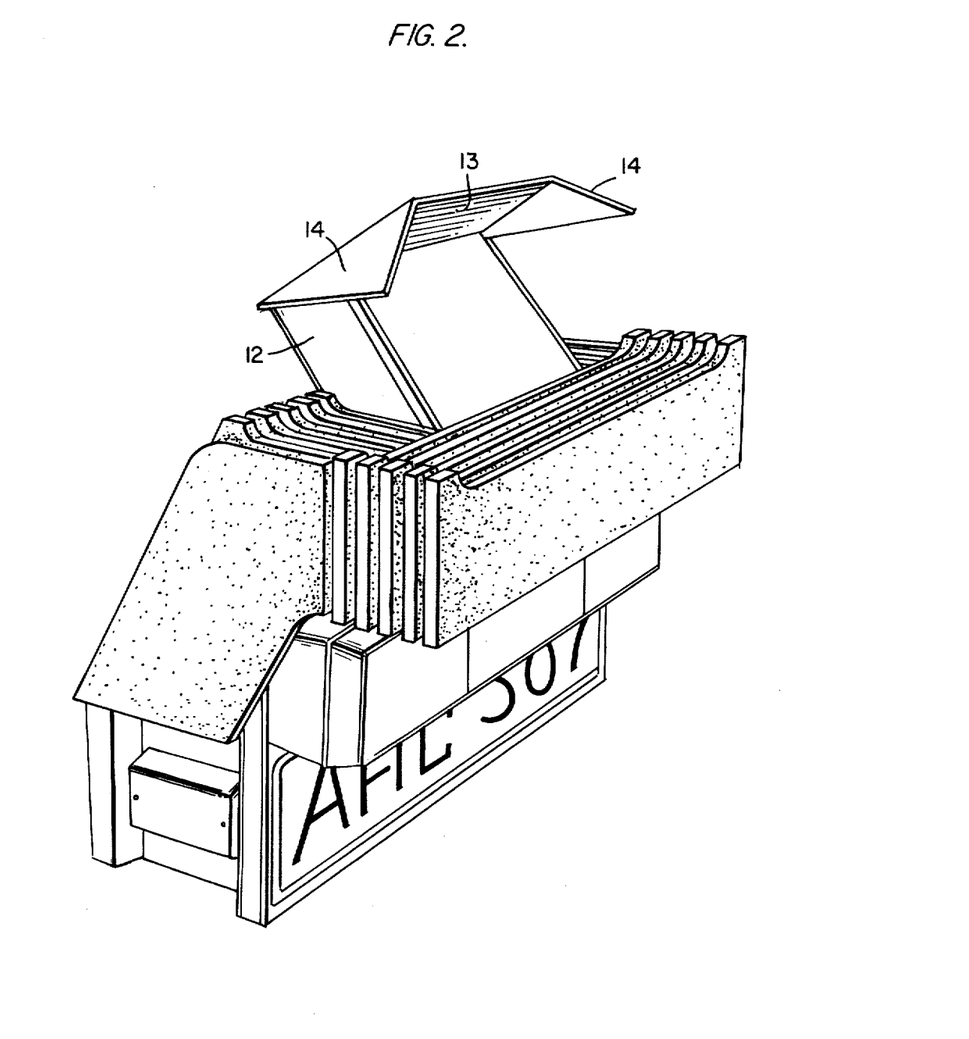
FIG. 2 shows the assembled box unit ready to be mounted on a lorry.
Figure 3:
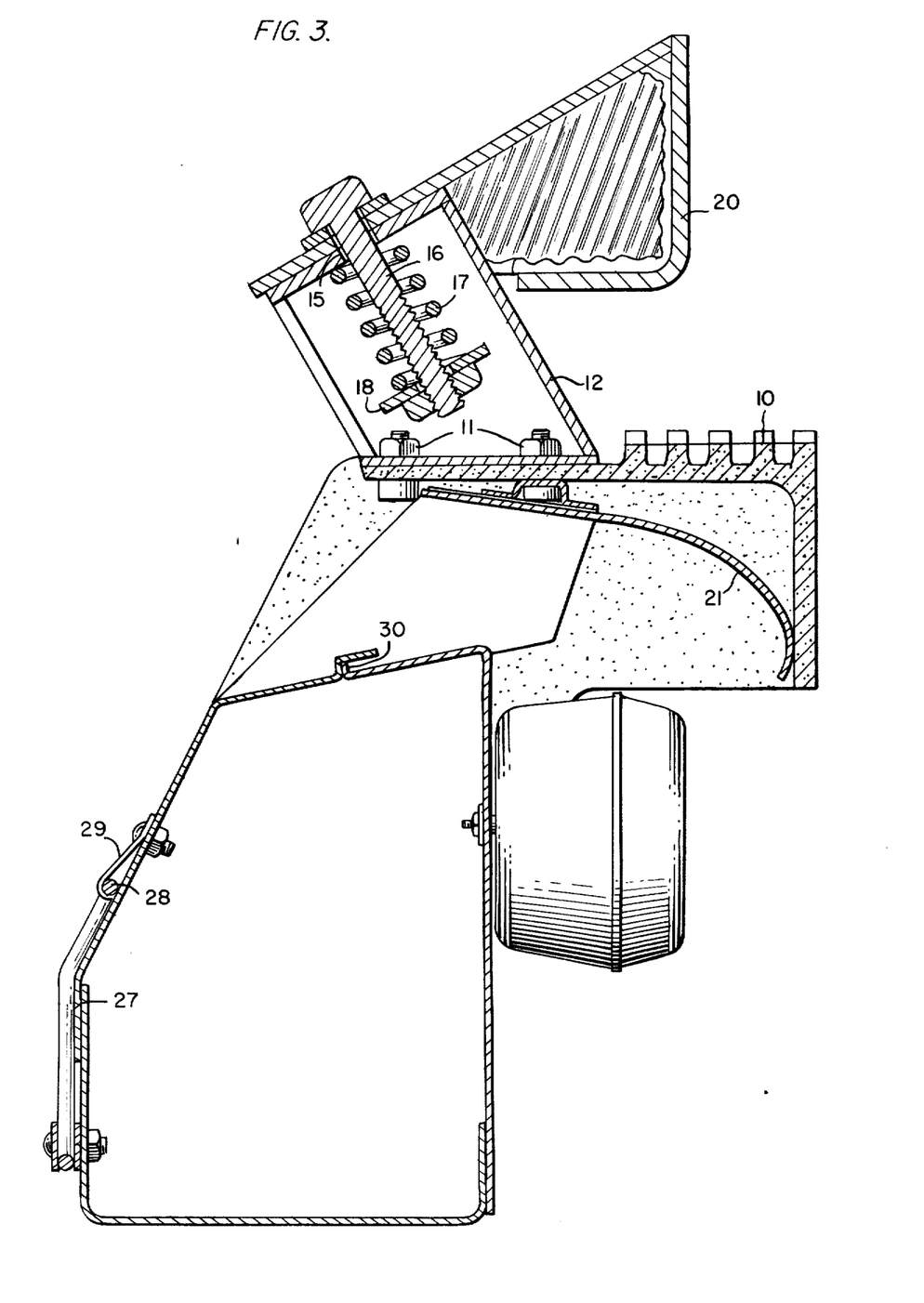
FIG. 3 is a vertical transverse section of the box unit according to the invention as mounted on a lorry.

The lamp box unit shown in FIG. 1 in exploaded perspective view is composed of serveral component parts. A mounting box 1, suitably made of plate, is designed to carry a lamp array 2, a number plate 3 and a side lamp 5 adopted to be inserted into a recessed pocket 4. As appears, for example, from FIG. 3 the box 1 is preferably also provided with a bottom 6 and a pivotally mounted lid 7 permitting access to the interior of the box unit. This lower part of the box unit is adopted to be attached to an overlying, preferably casted part 9 forming the climbing step 10. A suspending box 12 is steadily attached to step part 9, 10 (for example by means of the bults 11 shown in FIG. 3) is intended to be attached to a mounting plate 13 welded to the vehicle. The mounting plate 13 has corner portions 14 extending at an oblique angle therefrom as well as a hole 15 receiving a mounting screw 16. As appears particularly from FIG. 3 lid 7 is adopted to be latched by means of a quick latch comprising a rubber cable 27 firmly attached at its lower part to box 1 and extending across the overlapping portion of lid 7 and box 1, said cable being lockable by insertion of its handle 28 in a locking eye 29 attached at one end to lid 7. Hereby the lid 7 is prevented from inadvertently swinging upwardly about its upper hinge 30. Within box 12 there is enclosed a portion of screw 16 mounting a spring 17 between the upper surface of box 12 and a holding washer 18 mounted by e.g. welding. A flexible hose (not shown) is attached at a suitable place to mounting box 1 and extends to a connection terminal to serve as an inlet bushing. FIG. 3 shows how the entire unit is suspended in the plate 13, 14 which in turn is screwed to the rear portion 20 of the lorry. If the whole box unit is obliquely shifted in a lateral direction box 12 will be shifted up onto the oblique portions 14 and when the shifting thrust has ceased the unit will revert to its original position due to the action of the inclined surface.

Figure 7:
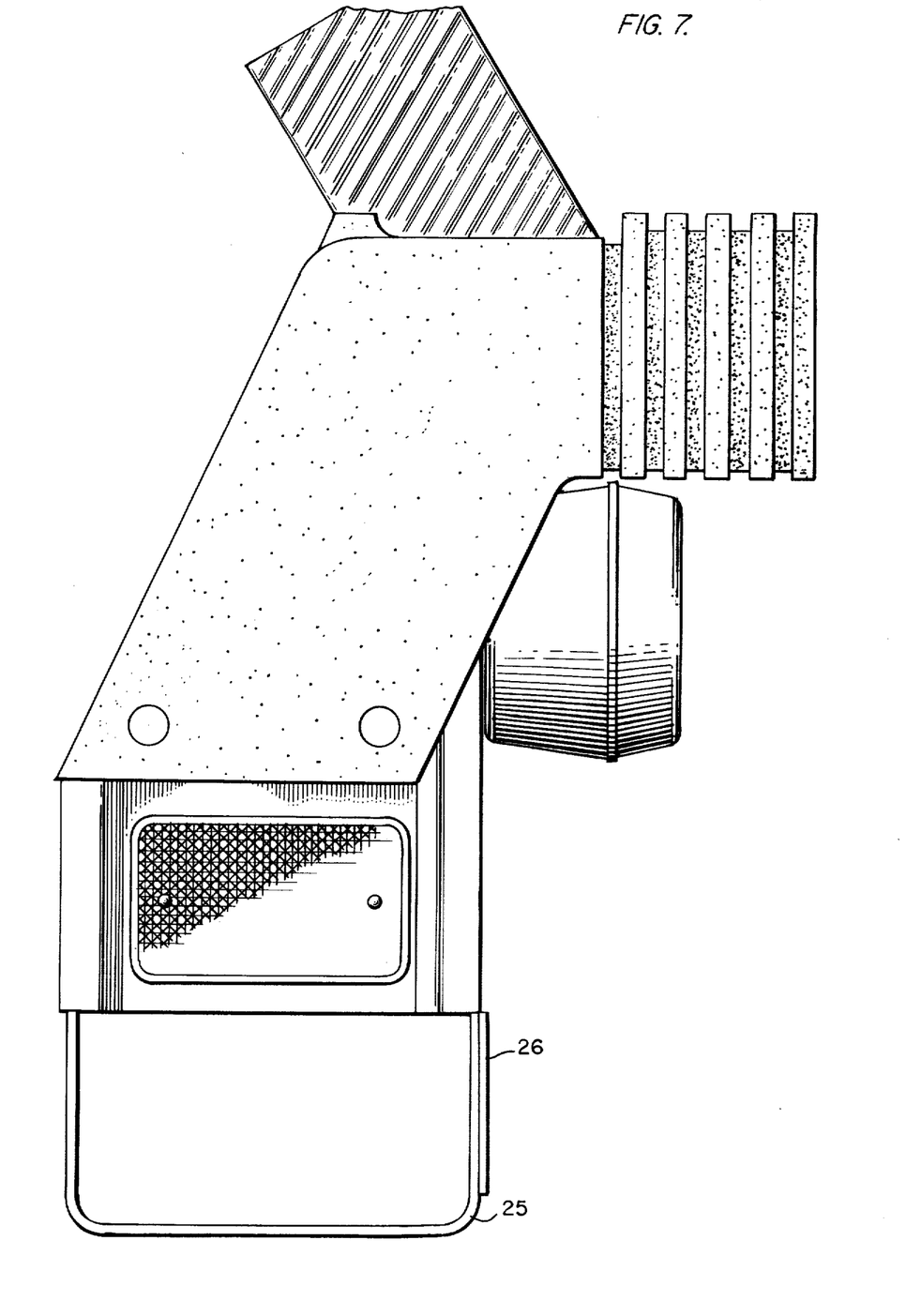
FIG. 7 is a side elevation of the box unit showing an additional side climbing step as well as a lower reflector and FIG. 8 is a rear view of the unit shown in FIG. 7.
Figure 8:
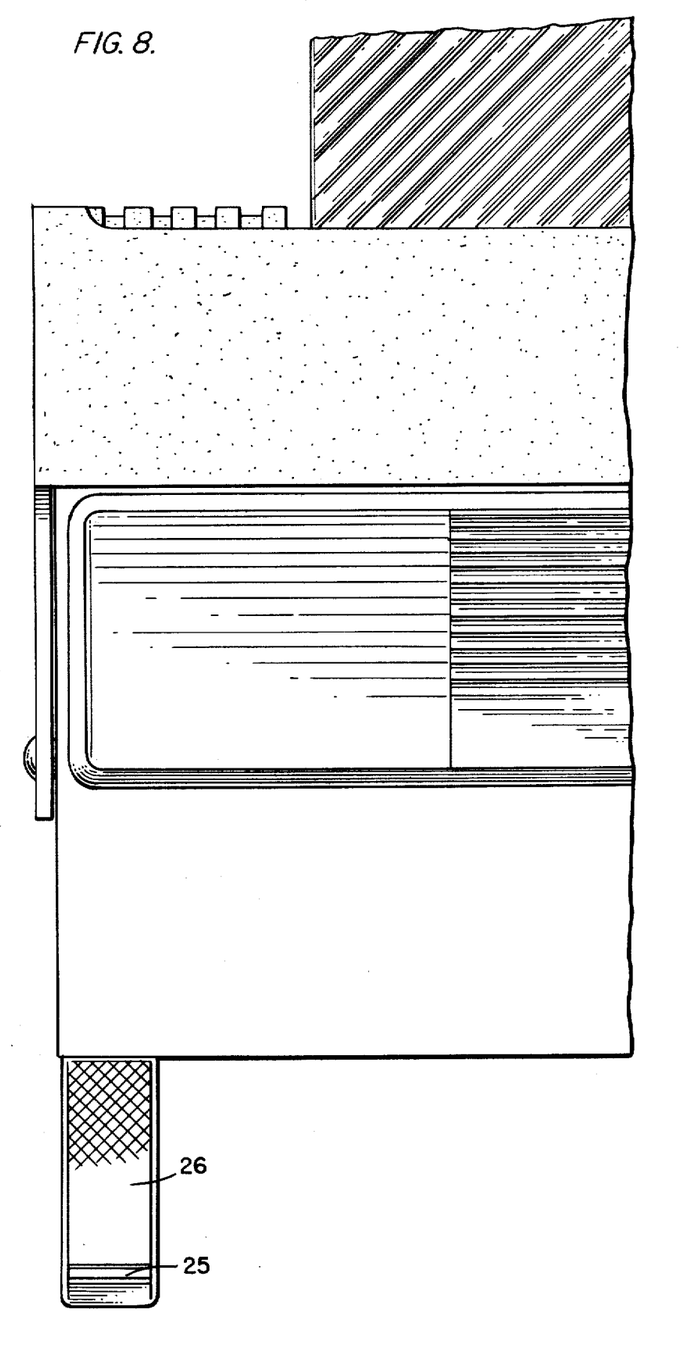

Below the side portion where side lamp 4 is mounted also the above mentioned side foot step 25 may be attached as shown in FIGS. 7 and 8. An additional lower reflector 26 is provided on the rearwardly facing side of the side foot step 25.

For the purpose of reducing the tendency towards soiling the box unit according to the invention is provided with an air-guiding device, so-called spoiler 21. This spoiler 21 guides the incoming air such as to flow in a rearward direction through the box unit and to pass downwardly over the rear light array and the number plate in order to eliminate the negative pressure previously occuring there and in this way rather to prevent sand and other whirling soiling particles from being sucked against the box unit.

Figure 4:
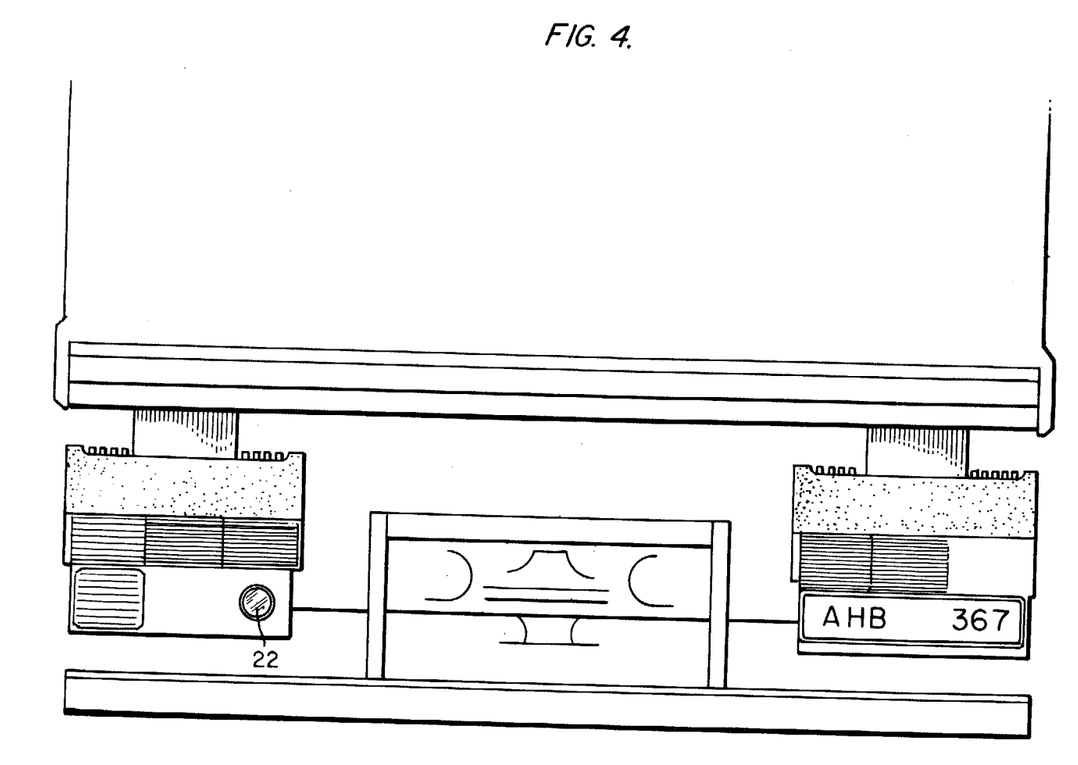
FIG. 4 shows the rear portion of a lorry provided with two units according to the invention seen straight from the rear.

FIG. 4 illustrates how a box unit according to the invention enables for example a current socket 22 to be mounted in an illuminated position. As mentioned above other current sockets or other equipment, for example the lift manipulating member can be placed either in a protected position on the unit or simply within the space provided in the box unit.

Figure 5:
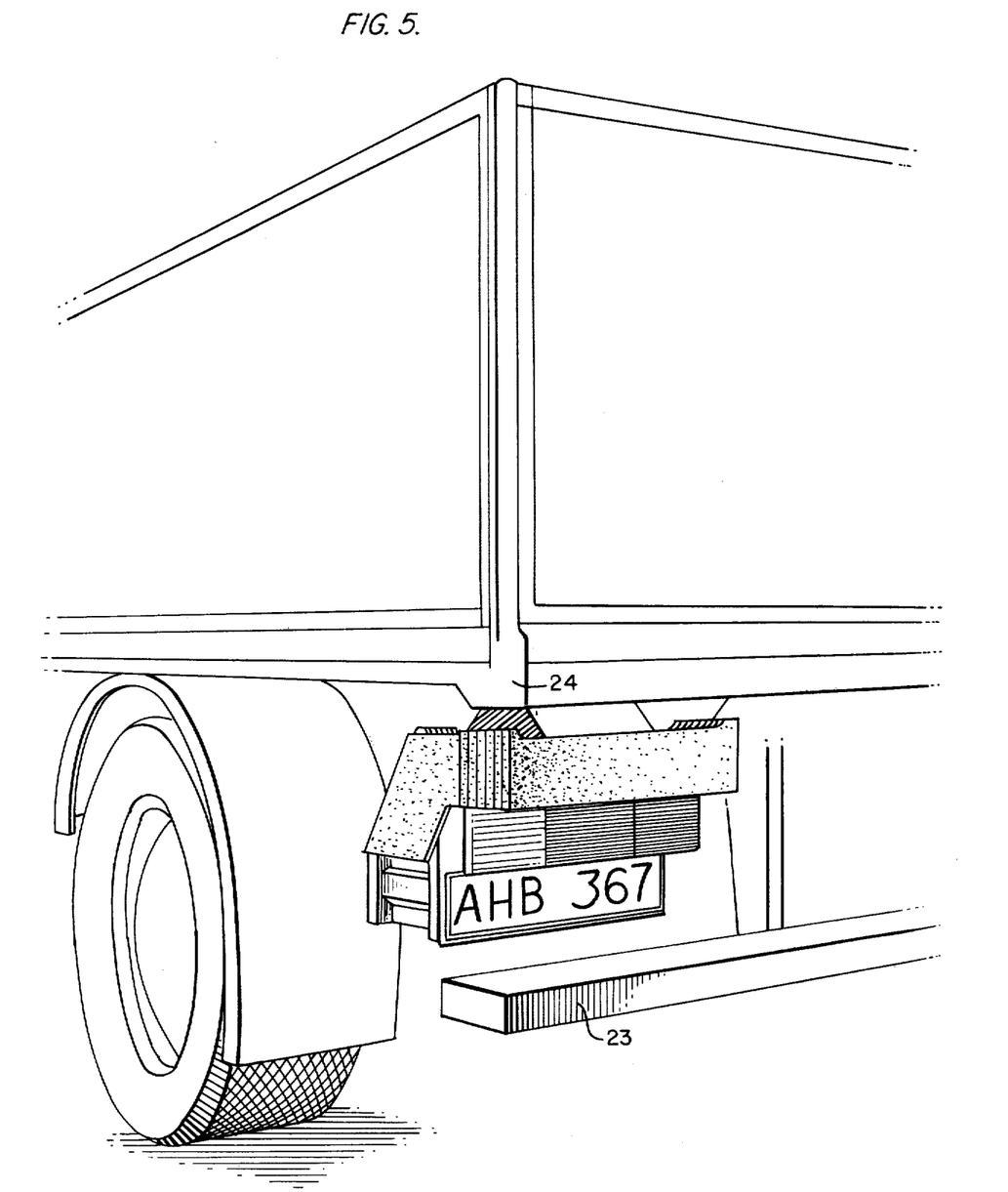
FIG. 5 illustrates how the unit is mounted on a lorry seen obliquely from the rear.

FIG. 5 illustrates the final positioning of the box unit in a protected position between the underdrive protection 23 and the backing protection 24. If in spite of this some minor backing accident should occur at a place where collisions are possible within the mounting range of the lamp box unit, the unit itself has a recessed, protected mounting place for the tender lamps and lamp glasses, the resilient suspension also enabling the unit to be displaced as a whole rather than being damaged.

Figure 6:
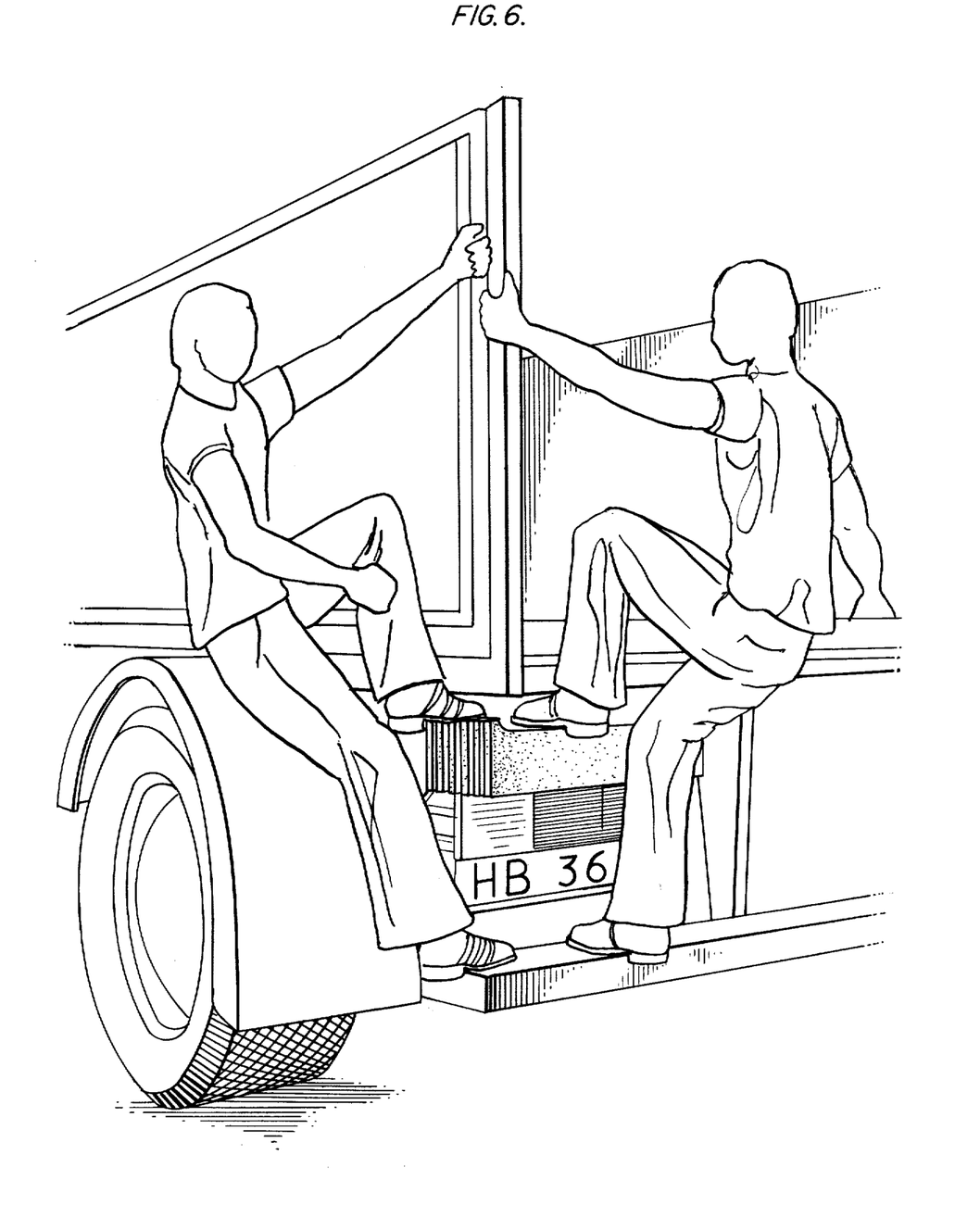
FIG. 6 schematically illustrates how the box unit according to the invention forms a climbing step which is accessible straight from the rear of the lorry platform as well as from the side of the platform.

FIG. 6 shows how the lamp box unit according to the invention provides a climbing step facilitating climbing the loading platform, it being noted that there is equal possibilities to climb up onto the loading platform straight from the rear as well as from the side.

It will appear from the above detailed description of the preferred embodiment of the invention that the above indicated purposes of the invention have been realized in an attractive way. The expert on the field will obviously understand that many of the parts of the box unit may be varied and modified within the basic inventive idea as defined in the attached claims.

What I claim is:

1. A holding unit for a vehicle comprising mounting means for mounting of at least one vehicle light and at least one vehicle number plate,
   climbing means attached to said mounting means for facilitating climbing upon said vehicle, and
   resilient suspension means attached to said climbing means for suspending said climbing means and said mounting means from said vehicle.

2. The holding unit of claim 1 wherein said mounting means includes a box-like structure having a pivotally mounted lid attached thereto which may be pivoted to an open or closed position relative to a hollow area internal of said box.

3. The holding unit of claim 1 or 2 wherein said resilient suspension means includes a mounting plate for attachment to said vehicle, and a suspending box, said suspending box being resiliently attached to said mounting plate, and said climbing means being attached to said suspending box.

4. The holding unit of claim 3 wherein said resilient suspension means further includes a bolt extending through an aperture in said mounting plate and an aperture in said suspending box, said bolt extending into said suspending box and through a spring, and a nut screwed upon said bolt to retain said spring between said nut and said suspending box.

5. The holding unit of claim 2 wherein said box-like structure includes an inlet bushing attached to one side thereof, said inlet bushing comprising a flexible hose.

6. The holding unit of claim 1 or 2 wherein said climbing means includes a first climbing step attached to the top of said mounting means for facilitating climbing upon said vehicle from the rear end thereof and a second climbing step attached to the side of said mounting means for facilitating climbing upon said vehicle from the side thereof.

7. The holding unit of claim 1, 2 or 5 wherein said holding unit includes means mounted between said mounting means and said climbing means for reducing the tendency towards soiling said mounting means during movement of said vehicle.

8. A holding unit for a vehicle comprising a box-like mounting member at least one side thereof being provided with at least one recess therein, at least one vehicle light mounted within said recess, and at least one side of said member including a number plate mounting surface,
   a climbing step attached to said mounting member, and
   resilient suspension means attached to said climbing step for suspending said climbing step and said mounting member from said vehicle.

9. The holding unit of claim 8 wherein said resilient suspension means includes a mounting plate for attachment to said vehicle, and a suspending box, said suspending box being resiliently attached to said mounting plate, and said climbing step being attached to said suspending box.

10. The holding unit of claim 9 wherein said resilient suspension means further includes a bolt extending through an aperture in said mounting plate and an aperture in said suspending box, said bolt extending into said suspending box and through a spring, and a nut screwed upon said bolt to retain said spring between said nut and said suspending box.

11. The holding unit of claims 8, 9 or 10 wherein said holding unit includes means mounted between said mounting member and said climbing step for reducing the tendency towards soiling said mounting member during movement of said vehicle.

* * * * *